United States Patent
Doddaiah et al.

(10) Patent No.: US 11,467,906 B2
(45) Date of Patent: Oct. 11, 2022

(54) STORAGE SYSTEM RESOURCE REBUILD BASED ON INPUT-OUTPUT OPERATION INDICATOR

(71) Applicant: EMC IP Holding Company LLC, Hopkinton, MA (US)

(72) Inventors: Ramesh Doddaiah, Westborough, MA (US); Bernard A. Mulligan, III, Cumberland, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 437 days.

(21) Appl. No.: 16/530,682

(22) Filed: Aug. 2, 2019

(65) Prior Publication Data

US 2021/0034463 A1 Feb. 4, 2021

(51) Int. Cl.
| | |
|---|---|
| *G06F 11/00* | (2006.01) |
| *G06F 11/10* | (2006.01) |
| *G06F 11/14* | (2006.01) |
| *G06F 13/12* | (2006.01) |
| *G06F 3/06* | (2006.01) |

(52) U.S. Cl.
CPC .......... *G06F 11/1092* (2013.01); *G06F 3/067* (2013.01); *G06F 3/0619* (2013.01); *G06F 3/0653* (2013.01); *G06F 3/0656* (2013.01); *G06F 11/1415* (2013.01); *G06F 13/122* (2013.01)

(58) Field of Classification Search
CPC . G06F 11/1092; G06F 11/1402; G06F 3/0619
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| (Continued) | | |

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.
EMC Corporation, "Unstoppable Data Reduction: Always-on, In-Line, Zero-Penalty, Enterprise-Class, Free," https://store.emc.com/xtremio, Jul. 2014, 2 pages.
EMC Corporation, "Introduction to XtremIO Virtual Copies," White Paper, Mar. 2016, 39 pages.

(Continued)

*Primary Examiner* — Philip Guyton
(74) *Attorney, Agent, or Firm* — Ryan, Mason & Lewis, LLP

(57) ABSTRACT

An apparatus comprises a storage system comprising at least one processing device and a plurality of storage devices. The at least one processing device is configured to obtain a given input-output operation from a host device and to determine that the given input-output operation comprises an indicator having a particular value. The particular value indicates that the given input-output operation is a repeat of a prior input-output operation. The at least one processing device is further configured to rebuild at least one resource of the storage system that is designated for servicing the given input-output operation based at least in part on the determination that the given input-output operation comprises the indicator having the particular value.

20 Claims, 6 Drawing Sheets

(56) References Cited

U.S. PATENT DOCUMENTS

| | | | |
|---|---|---|---|
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 2003/0016596 | A1* | 1/2003 | Chiquoine .......... G06F 11/1076 369/34.01 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2011/0276831 | A1* | 11/2011 | Perelstein ........... G06F 11/0727 714/E11.029 |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2017/0329683 | A1* | 11/2017 | Lien ..................... G06F 3/0619 |

OTHER PUBLICATIONS

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

NVM Express Base Specification, Revision 1.4, Jun. 10, 2019, 403 pages.

* cited by examiner

STORAGE SYSTEM RESOURCE REBUILD BASED ON INPUT-OUTPUT OPERATION INDICATOR

FIELD

The field relates generally to information processing systems, and more particularly to storage in information processing systems.

BACKGROUND

Applications often issue or submit input-output (IO) operations to a storage system for servicing. The storage system allocates resources for servicing the IO operations and returns an output to the application upon completion. For example, the storage system may return target data as part of servicing a read IO operation, a confirmation of a successful write as part of servicing a write IO operation or other similar outputs. Storage systems often utilize a variety of resources for servicing a given IO operation. For example, a storage system may utilize processing devices, memory, cache, buffers, mapping and masking tables or other resources to service an IO operation.

SUMMARY

Illustrative embodiments provide techniques for IO hinting in a storage system. For example, in one embodiment, an apparatus comprises a storage system comprising at least one processing device and a plurality of storage devices. The at least one processing device is configured to obtain a given input-output operation from a host device and to determine that the given input-output operation comprises an indicator having a particular value. The particular value indicates that the given input-output operation is a repeat of a prior input-output operation. The at least one processing device is further configured to rebuild at least one resource of the storage system that is designated for servicing the given input-output operation based at least in part on the determination that the given input-output operation comprises the indicator having the particular value.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
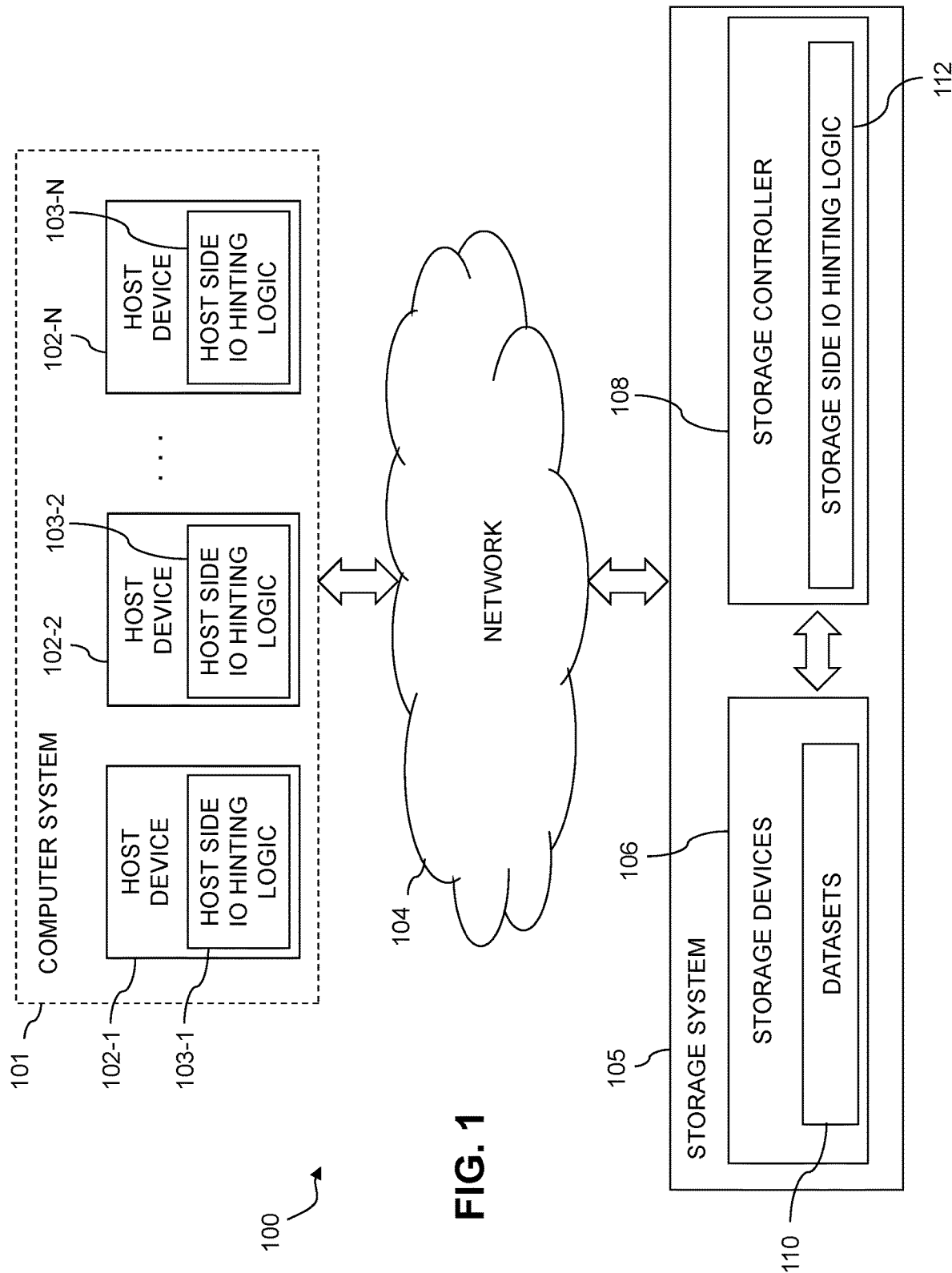
FIG. 1 is a block diagram of an information processing system comprising a storage system configured with IO hinting functionality in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users. In illustrative embodiments, the host devices 102 comprise respective host side IO hinting logic 103-1, 103-2 . . . 103-N, also referred to herein collectively or individually as host side IO hinting logic 103. Host side IO hinting logic 103 is configured to function in conjunction with a storage side IO hinting logic 112 of the storage system 105 to implement a hinting mechanism for IO operations as will be described in more detail below.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store datasets 110, which may comprise logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Figure 2:
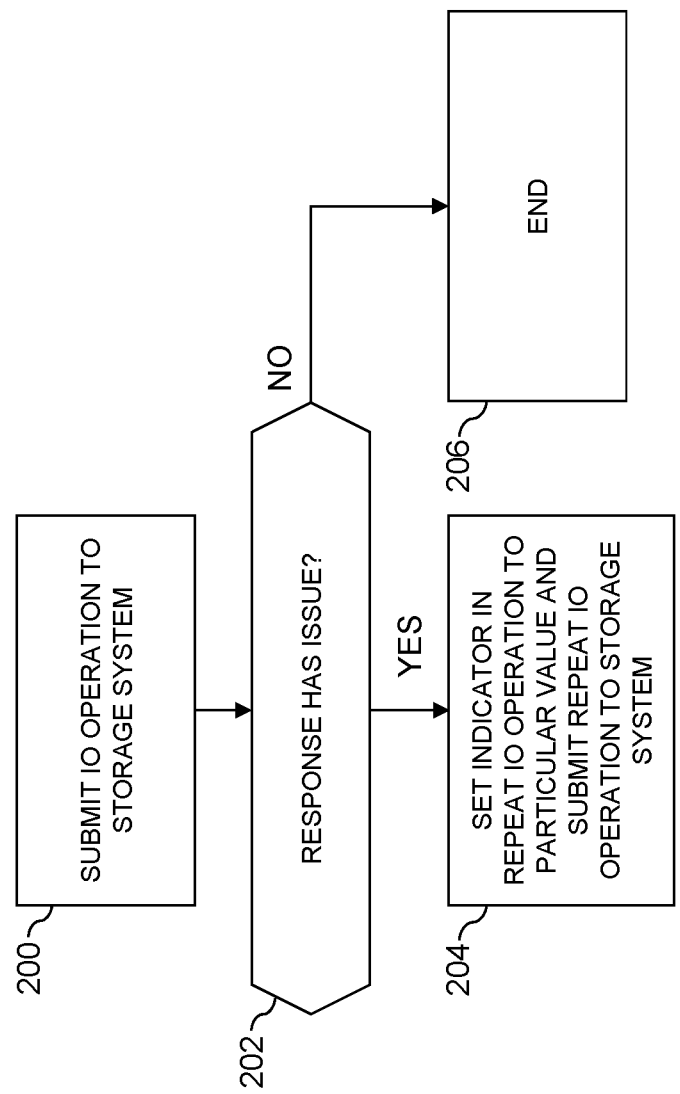
FIG. 2 is a flow diagram of an example process according to a host side IO hinting functionality in an illustrative embodiment.
Figure 3:
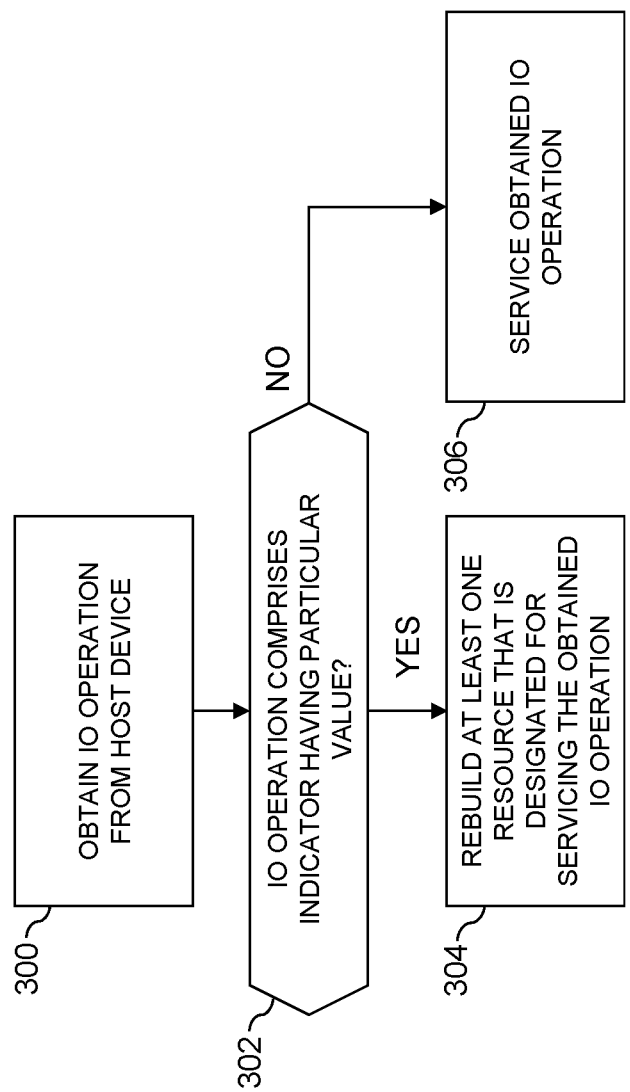
FIG. 3 is a flow diagram of an example process according to a storage side IO hinting functionality in an illustrative embodiment.

The storage controller 108 of storage system 105 in the FIG. 1 embodiment includes storage side IO hinting logic 112 which is configured to function in conjunction with host side IO hinting logic 103 to implement a hinting mechanism for IO operations such as that illustrated in the flow diagrams of FIGS. 2 and 3. Host side IO hinting logic 103 and storage side IO hinting logic 112 may also be collectively referred to herein as IO hinting logic. The storage system 105 should also be understood to include additional modules and other components typically found in conventional implementations of storage systems, although such additional modules and other components are omitted from the figure for clarity and simplicity of illustration.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 4-6.

It is to be appreciated that these and other features of illustrative embodiments are presented by way of example only and should not be construed as limiting in any way.

Accordingly, different numbers, types and arrangements of system components such as host devices 102, host side IO hinting logic 103, network 104, storage system 105, storage devices 106, storage controller 108, datasets 110 and storage side IO hinting logic 112 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for the IO hinting logic can be implemented in the storage system, in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

In some cases, when an IO operation is submitted to a storage system by a host device, the storage system may return an output that is not as expected. For example, the target data returned by the storage system to the host device in response to the IO operation may be corrupted in a manner which is not visible to the storage system. While the target data stored on the storage devices themselves may be sound, the corresponding data stored in an intermediary resource such as, e.g., cache, metadata, or in other locations, that is utilized to service the IO operation may be corrupted. In response to receiving such corrupted data, a host device typically attempts to repeat the IO operation using the same resources or different resources of the storage system. However, such a repeat may often run afoul of the same corrupted data even when a different resource is utilized. For example, even when a different resource is utilized, that resource will typically obtain the same corrupted data from the original resource for servicing the repeat IO operation.

In a first example scenario, a primary instance of an application container is configured to panic when an IO operation encounters an issue such as, e.g., corruption, with a target driver or other resource of the storage system. When the container panics, the host device will initiate a secondary instance of the container to repeat the IO operation. In such a case, the secondary instance may also panic for the same reason. This may occur even where the secondary instance is executing on an entirely different hardware component of the storage system than the original instance. This problem may continue with successive new container instances panicking due to the same issue until a crash in the application occurs.

In a second example scenario, data in a cache buffer becomes silently corrupted. Because the corruption is silent, the storage system does not know about it. The host device runs a virtual server in a first container which attempts to access the corrupt data in the cache buffer using an IO operation. The server instance panics due to the corrupted data. The host device monitoring the server instance sees the panic and fails over the server instance to a second container in an attempt to access the target data in the cache buffer via a new path, the server instance again attempts to access the corrupt data in the cache slot. The server instance panics again and continues as above, repeatedly attempting to access the same corrupt data. Corrective action is not taken by the storage system since the storage system is unaware that the data is corrupt.

In a third example scenario, a host device may submit a READ-10 command at logical block address (LBA) 0x100 for logical block count (LBC) 0x8 (4 KB). The READ-10 command may comprise a command descriptor block (CDB) of 28000000010000010000. The storage system services the read using a first hardware component from a local cache buffer which has corrupted data in it. The fact that the data is corrupted is not visible to the storage system but the application detects that the data is corrupt upon receipt. The host device then repeats the read with the same CDB of 28000000010000010000 using another path or other resources. Since the storage system does not know the data that it served in the cache buffer is corrupt, a second hardware component of the storage system that receives the repeat read request sends a request to the first hardware component to copy the cache buffer to the second hardware component. The first hardware component receives the request and pushes the corrupt buffer over to the second hardware component. The second hardware component then services the read from its newly received cache buffer and again provides the corrupted data to the host device. The host device again detects that the received data is corrupted. The sequence repeats each time with a new container instance until the application either times out or crashes.

In illustrative embodiments, such issues may be overcome by utilizing the disclosed IO hinting logic. As mentioned above, IO hinting logic comprises host side IO hinting logic 103 and storage side IO hinting logic 112, which are collectively referred to herein as IO hinting logic.

IO hinting logic utilizes an IO hinting indicator which is included in IO operations submitted to the storage system 105 by a host device 102. For example, an indicator such as, e.g., one or more bits of an IO operation, may be set by the host device 102 to a value that indicates to the storage system 105 that an attempt to service a previous IO operation has resulted in an unanticipated output such as, e.g., corrupted data or other issues. The indicator indicates that the current IO operation is a repeat of that previous IO operation. The setting of the indicator in the repeat IO operation by the host device 102 indicates to the storage system 105 that one or more of the resources utilized to service the previous IO operation are compromised. In response to the detecting the indicator in the current IO operation, the storage system 105 takes a corrective action such as, e.g., purging and rebuilding the one or more resources that were utilized for servicing the previous IO operation. For example, the storage system may purge and rebuild resources such as, e.g., cache buffers, fibre channel (FC) exchange, input-output control blocks (IOCBs), IO records, masking and mapping tables, or other resources of the storage system. In some embodiments, rebuilding the one or more resources comprises allocating secondary resources such as, e.g., alternative cache buffers, alternative mapping and masking tables or other alternative resources, to service the repeat IO operation which reduces the probability of further issues.

As an example, the IO hinting logic may be utilized in the first scenario mentioned above. For example, when the primary container instance panics and its watchdog starts or reboots a secondary container instance, host side IO hinting logic 103 sets the indicator in the repeat IO operation issued by the secondary container instance. For example, the indicator may be set by setting one or more bits of the CDB of the IO operation to a predetermined value. In some embodiments, any secondary or new container instances which start after this point will set the indicator in the CDB until the host device determines that the IO operations are stable and the issues have been resolved. The storage side IO hinting logic 112 will read the IO operation and determine that the indicator is set. In response to the indicator being set, the storage side IO hinting logic 112 causes the storage system 105 to perform a rebuild operation on one or more of the resources associated with the IO operation.

As another example, the IO hinting logic may be utilized in the second scenario mentioned above. When the server instance panics due to the corrupted data, the host side IO hinting logic 103 may issue a server command that enables recovery hinting using the indicator in the CDB. While in recovery, any server commands issued to the storage system 105 will include the indicator set to a predetermined value which indicates that there was an issue. The storage side IO hinting logic 112 receives the server command with the indicator set and performs an on-first-access drop of any tracks for devices that will be used by the server command. A read to the track that had corrupted data in cache according to the server command now succeeds and there is no data unavailable response returned from the storage system 105.

As another example, the IO hinting logic may be utilized in the third scenario mentioned above. For example, as above, the host device 102 submits the READ-10 command at LBA 0x100 for LBC 0x8 (4 KB) with a CDB of 28000000010000010000. The storage system services the read using a first hardware component from a local cache buffer which has corrupted data in it. The fact that the data is corrupted is not visible to the storage system but the application detects that the data is corrupt upon receipt. The host device 102, seeing the corrupt data, implements host side IO hinting logic 103 which repeats the read but this time utilizes a CDB of 28000000010000010040, the same CDB but with the indicator set. For example, a generic recovery bit in the control byte vendor specific area, e.g., bit 0x6 is set in the CDB. The new CDB is sent down another path. The storage system 105 does not know the data it served in the cache buffer is corrupt, but, using storage side IO hinting logic 112, sees that the generic recovery bit is set in the new CDB. Instead of requesting that the cache buffer of the first hardware component be copied to the second hardware component, as described above, the cache buffer is instead discarded, and the read IO operation is placed into the read miss flow which requires a read of the source data from source storage device.

In each of these scenarios, issues such as corrupted data, drivers, metadata or other failed resources which are not visible to the storage system are handled through the inclusion of the hinting indicator with the repeat IO operation from the host device 102 to the storage system 105. This hinting mechanism allows the storage system 105 to handle these issues in a manner that does not result in the host device continuously attempting to access the data without actually resolving the issues.

In a first example embodiment, the storage system 105 may utilize a remote device facility (RDF) which stores backup or replica information associated with local storage devices 106. In such an embodiment, whenever the storage system 105 receives IO operations having the indication, e.g., one or more bits of the CDB that are set to a predetermined value, the storage system 105 may make a local mirror not ready and rebuild one or more of the mapping, masking, metadata or other resources associated with the IO operation. In an illustrative embodiment, the storage system 105 will also utilize the RDF to service the IO operations, e.g., during the rebuild, which drastically reduces the probability of the host device 102 encountering the same issue again. For example, assuming the issue was caused by bad local hardware, bad local software, corrupted local data, or other similar issues, the use of an RDF to service the IO operations during the rebuild greatly reduces future data unavailable or data lost issues.

In a second example embodiment, for example, where the storage system 105 stores replicas locally, whenever the storage side IO hinting logic 112 receives an IO operation that comprises the indicator, the storage side IO hinting logic 112 will rebuild one or more of the mapping, masking, metadata or other resources associated with the IO operation from scratch and will additionally utilize the local replication storage devices to service the IO operations. This embodiment also reduces the probability of the host device 102 encountering the same issue again. For example, assuming the issue was caused by bad local hardware, bad local software, corrupted local data, or other similar issues, utilizing local replica devices which use a different set of resources greatly reduces the future data unavailable or data lost issues.

In a third example embodiment, for example, whenever the storage side IO hinting logic 112 receives an IO operation that comprises the indicator, the storage side IO hinting logic 112 will purge the complete local in-use set of resources needed by this IO operation and rebuild one or more of the mapping, masking, metadata or other resources associated with the IO operation from scratch. As an example, storage side IO hinting logic 112 may rebuild mapping, masking and initiator tables from global memory. The storage side IO hinting logic 112 may then utilize remote resources such as, e.g., remote data services, remote communication or remote disk adapters and, as much as possible, remote fabric. For example, storage side IO hinting logic 112 may attempt to avoid as much of the local memory and local resources that were utilized by the original IO operation as possible to reduce the probability of the host device 102 encountering the same issue again. For example, assuming the issue was caused by bad local hardware, bad local software, corrupted local data, or other similar issues, utilizing a different set of remote resources greatly reduces the future data unavailable or data lost issues.

While described as separate embodiments, it is understood that storage side IO hinting logic 112 may implement one or more of the above embodiments individually or in combination.

In illustrative embodiments, the storage side IO hinting logic 112 selects one or more of the above three embodiments for responding to the presence of the indicator in the IO operation. For example, in some embodiments, the storage side IO hinting logic 112 may utilize the first example embodiment as the best solution, the second example embodiment and as a next best solution and the third example embodiment as a last option based on available configuration in the storage system. In other embodiments, other orders may also or alternatively be utilized.

While the above three embodiments describe actions that may be taken by storage side IO hinting logic 112 in response to the detection of an indicator in the IO operation, any other embodiments or actions may also or alternatively be taken. For example, the above three embodiments are a non-limiting set of examples of actions that may be taken by storage side IO hinting logic 112.

Once the host side IO hinting logic 103 determines that the application IO operations are proceeding without detecting any more issues, e.g., the data has been retrieved without corruption, host side IO hinting logic 103 may stop the application from setting the indicator in future IO operations. In some embodiments, the IO hinting logic may alternatively utilize target reserved start and stop opcodes instead of bits as the indicator. For example, once a panic occurs, the host side IO hinting logic 103, e.g., using a watchdog thread or the secondary container instance, may transmit a vendor reserved start opcode such that subsequent target IO operations will make sure to rebuild all required resources from scratch while utilizing one of the first, second, or third embodiments as discussed above. Once the application IO operations are in stable condition, the host side IO hinting logic 103 may issue the relevant vendor reserved stop opcode to the application to stop this mode of operation for future IO operations.

In some cases, for example, where some or all of the software or hardware of the host device 102 and the storage system 105 are from the same vendor, the IO hinting logic may utilize the knowledge of the internal architecture of the common components to determine more specific modes of recovery. For example, the host side IO hinting logic 103 may indicate which path it will be redriving the read on to the storage side IO hinting logic 112 as part of the indicator. Such a configuration would enable the storage system to not only flush and rebuild targeted problematic resources that are determined to have issues such as, e.g., corrupted data, but also to prefetch the corresponding data from storage devices and write it into an alternative cache buffer on the hardware targeted by the repeat IO operation in preparation for the repeat of the IO operation.

Storage system 105, in some embodiments, may also return status information about the success of the repeat IO operation in its sense data payload. For example, when utilizing the Small Computer System Interface (SCSI) protocol, the status information may be embedded in the fixed format sense data descriptor. If, for example, the storage system 105 had some internal problem that prevented it from rebuilding the resources as required to service the repeated IO operation, the storage system could indicate a failure status in the sense data. Instead of the application of the host device 102 continuing to repeat the IO operation over and over, the host device 102 may instead commence recovery on its side such as, e.g., a database rollback.

While described above with respect to the CDB of an SCSI command, it is understood that one or both of SCSI and non-volatile memory express (NVMe) commands may comprise the indicator. For example, each of the SCSI and NVMe protocols comprise commands having bits or bytes of data that are reserved, obsolete, or set aside for vendor specific commands. Any of these bits or bytes may be utilized as an indicator which provides hints from the host device 102 to the storage system 105 that an IO operation has returned an unintended result such as, e.g., corrupt data, which is not otherwise visible to the storage system 105.

SCSI Commands

In the SCSI protocol, read and write IO commands are communicated to the SCSI device server such as a disk array as CDBs. CDBs can be 6, 10, 12, 16, or 32 bytes, though the vast majority of CDBs in a production environment will often be 10 or 16 bytes. For example, they may comprise 10-byte Reads (opcode=0x28), 16-byte Reads (opcode=0x88), 10-byte Writes (opcode=0x2A) or 16-byte Writes (opcode=0x8A). The extra bytes on the 16-byte commands are used to store larger starting LBA offsets and in some cases larger transfer lengths, e.g., logical block counts.

All versions of the SCSI Block Commands (SBC) standard, which describes a core 110 protocol for all modern enterprise data centers, leave some bits in the CDBs reserved, obsolete or vendor-specific, which means that they are not defined nor used in the public standard. These are an example of bits that may be utilized as an indicator as described above.

For example, the free bits in SCSI read and write commands may comprise the following:

For READ-10 (0x28) there are 5 free bits, byte 0x1 bits 0-1 which are Obsolete and byte 0x6, bits 5-7 which are Reserved.

For READ-16 (0x88) there are 2 free bits, byte 0x1 bit 1 which is Obsolete and byte 0xE, bit 5 which is Reserved.

For WRITE-10 (0x2A) there are 6 free bits, byte 0x1 bits 0-1 which are Obsolete, byte 0x1 bit 2 which is Reserved and byte 0x6, bits 5-7 which are Reserved.

For WRITE-16 (0x8A) there are 3 free bits, byte 0x1 bit 1 which is Obsolete, byte 0x1 bit 2 which is Reserved, and byte 0xE, bit 5 which is Reserved.

In addition, the final byte of each CDB is known as a control byte which has the same definition and function for all SCSI commands. For 10-byte CDBs, the control byte is byte 0x9, for 16-byte CDBs the control byte is byte 0xF. In the SCSI protocol, there is only a single bit (bit 0x2; mask 0x04) defined for use in the control byte which leaves another 7 free bits available for use as the hinting indicator.

For the control byte for READ-10 and WRITE-10, byte 0x9, bits 0-1 are Obsolete, byte 0x9, bits 3-5 are Reserved, and byte 0x9, bits 6-7 are defined as vendor specific, which means that the vendor can use them for proprietary purposes.

For the control byte for READ-16 and WRITE-16, byte 0xF, bits 0-1 are Obsolete, byte 0xF, bits 3-5 are Reserved, and byte 0xF, bits 6-7 are defined as vendor specific.

As an example, a CDB of 280312345678E01234FB is a READ-10 (opcode 0x28) for the extent starting at LBA 0x12345678 and covering 0x1234 blocks from there. The 2 Obsolete bits in byte 1, the 3 reserved bits in byte 6, and the 7 obsolete/reserved/vendor-specific bits in byte 9 have been set as the indicator, for a total of 12 bits. The 12 bits may be utilized to provide a significant capacity for extensibility of the 'hinting' mechanism. For example, while in practice not all of the available bits will be set, the bits provide the ability to define a sparse 12-bit field which may be utilized by the IO hinting logic to represent values from 0 to 4096, e.g., 0 to 0xFFF or 0000 0000 0000 to 1111 1111 1111 in binary; 212 values). This field may be utilized to convey information between the host side IO hinting logic 103 and the storage side IO hinting logic 112 regarding the type of issue, e.g., corrupted data, failed paths, corrupted metadata, etc., to provide forward looking information such as, e.g., which paths or resources are targeted for use by the repeat IO operation which allows for pre-fetching and caching of the target data by the storage system, or in other similar manners.

In some embodiments, the storage side IO hinting logic 112 may send back status information about the success of the hint piggybacked on the sense data descriptor that it sends back with the SCSI Status, Sense Key, additional sense code (ASC), additional sense code qualifier (ASCQ), etc. Since there are many free bits to be found in the SCSI fixed format sense data descriptor, including all of byte 1, and bytes 2 and 3 in the information descriptor embedded in the sense data (e.g., bytes 3 to 6), and various other fields, including the sense-key-specific information descriptor. Storage side IO hinting logic 112 may leverage these available bits in the sense data descriptor to send back rich information to the host device 102 and host side IO hinting logic 103 to assist in troubleshooting and correcting any issues with the storage system 105. NVME Commands For NVMe commands, each command comprises a set of double words (DWORD) where one DWORD is equal to 4 bytes. As in SCSI, the standard leaves a number of bits as Reserved in each command definition. For example, NVMe read and NVMe write commands both use DWORD 13 which includes bits 8 to 31 (0x8 to 0x1F) which are defined as Reserved. These 23 free bits provide the potential to set a 23-bit indicator in the CDB, which enables a number space from 0 to 0x7FFFFF (0 to 8,388,607; 223 values). NVMe read and write commands are described in the NVMe Base Specification, Revision 1.4, June 2019, which is incorporated by reference herein in its entirety.

The NVMe read command reads data and metadata, if applicable, from the NVM controller for the LBAs indicated. The NVMe read command may specify protection information to be checked as part of the read operation. The NVMe read command uses the Command DWORD 10, Command DWORD 11, Command DWORD 12, Command DWORD 13, Command DWORD 14, and Command DWORD 15 fields. If the command uses NVMe Physical Region Pages (PRPs) for the data transfer, then one or more of the Metadata Pointer, PRP Entry 1, and PRP Entry 2 fields may be utilized for the indicator. If the NVMe read command uses Scatter Gather Lists (SGLs) for the data transfer, then one or more of the Metadata SGL Segment Pointer and SGL Entry 1 fields may be utilized for the indicator.

The NVMe write command writes data and metadata, if applicable, to the NVM controller for the logical blocks indicated. The host may also specify protection information to include as part of the operation. The NVMe write command uses Command DWORD 10, Command DWORD 11, Command DWORD 12, Command DWORD 13, Command DWORD 14, and Command DWORD 15 fields. If the NVMe write command uses PRPs for the data transfer, then one or more of the Metadata Pointer, PRP Entry 1, and PRP Entry 2 fields may be utilized for the indicator. If the NVMe write command uses SGLs for the data transfer, then one or more of the Metadata SGL Segment Pointer and SGL Entry 1 fields may be utilized as the indicator.

The operation of host side IO hinting logic 103 will now be described in further detail with reference to the flow diagram of the illustrative embodiment of FIG. 2. The process as shown in FIG. 2 includes steps 200 through 206. The process shown in FIG. 2 is suitable for use in system 100 but is more generally applicable to other types of information processing systems in which a storage system is configured to implement the IO hinting functionality. The steps of FIG. 2 are illustratively performed at least in part under the control of one or more processing devices of a host device 102.

At 200, an application executing on a host device 102 submits an IO operation to the storage system 105.

At 202, host side IO hinting logic 103 determines whether or not the application has received a response that has an issue, e.g., corrupt data, from the storage system 105. If the response comprises an issue, host side IO hinting logic 103 sets an indicator in a repeat IO operation to a particular value and submits the repeat IO operation to the storage system at 204. The particular value indicates that the repeat IO operation is a repeat of a prior IO operation that had an issue. If the response does not comprise corrupt data, the process ends at 206.

The operation of storage side IO hinting logic 112 will now be described in further detail with reference to the flow diagram of the illustrative embodiment of FIG. 3. The process as shown in FIG. 3 includes steps 300 through 306. The processes shown in FIG. 3 is suitable for use in system 100 but is more generally applicable to other types of information processing systems in which a storage system is configured to implement the IO hinting functionality. The steps of FIG. 3 are illustratively performed at least in part under the control of one or more processing devices of the storage system 105.

At 300, storage side IO hinting logic 112 obtains an IO operation from the host device 102. At 302, storage side IO hinting logic 112 determines whether or not the IO operation comprises an indicator having a particular value. The particular value indicates that the IO operation is a repeat of a prior IO operation that had an issue. If the IO operation comprises an indicator having the particular value, storage side IO hinting logic 112 rebuilds at least one resource that is designated for servicing the obtained IO operation at 304. If the IO operation does not comprise the indicator, the storage system 105 services the IO operation and the process ends at 306.

It is to be understood that for any methodologies described herein, e.g., host side and storage side IO hinting, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 108 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The host device 102 or the storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate the IO hinting functionality as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 105, and accordingly is assumed to be coupled to host devices 102 of computer system 101 via network 104 within information processing system 100.

The storage controller 408 in the present embodiment is configured to implement IO hinting functionality of the type previously described in conjunction with FIGS. 1-3. For example, the storage controller 408 includes storage side IO hinting logic 414 which is configured to operate in a manner similar to that described above for storage side IO hinting logic 112.

The storage controller 408 includes one or more processing devices each comprising a plurality of cores, which are configured to operate in a manner similar to that described above for implementing IO hinting functionality by storage controller 108.

Figure 4:
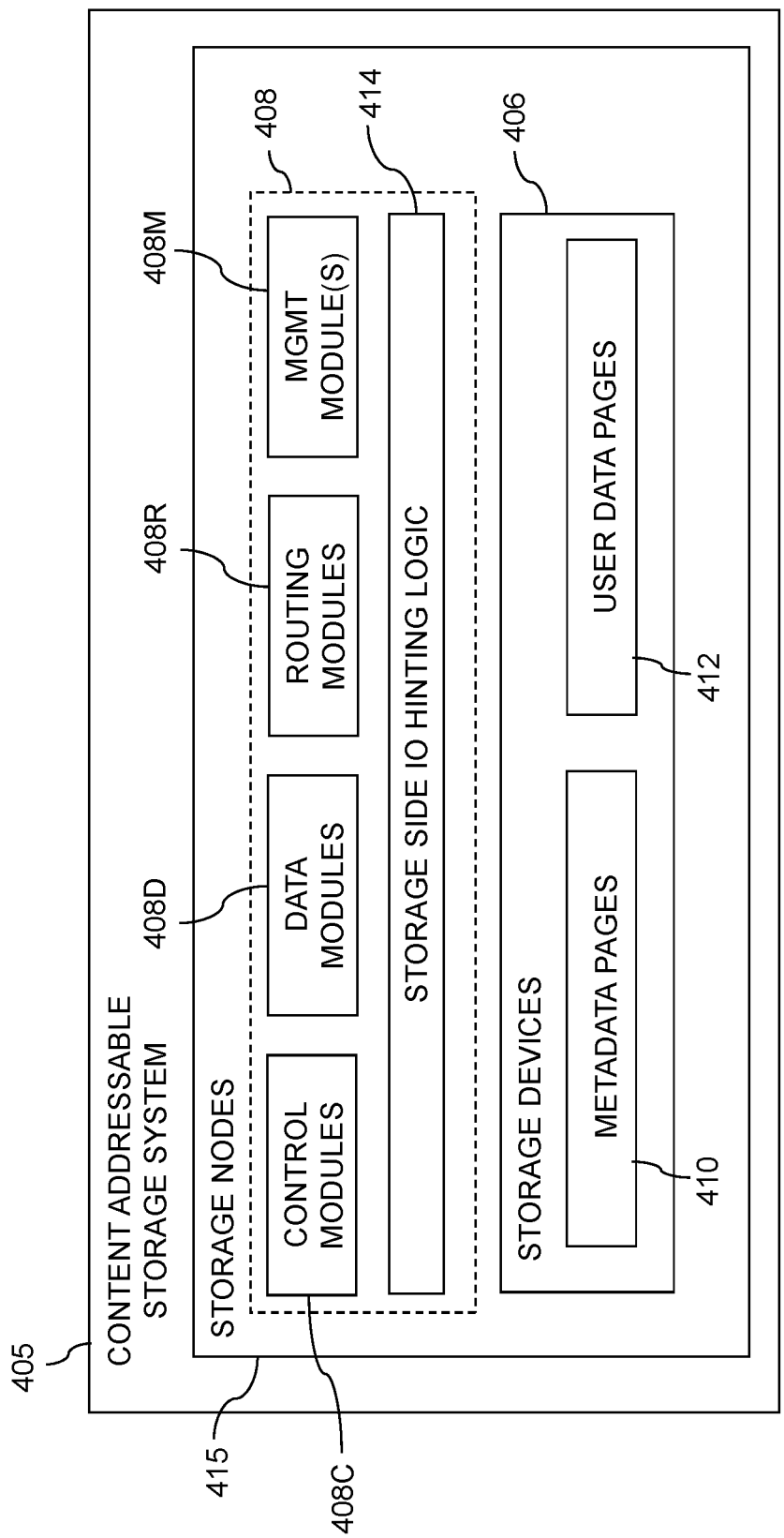
FIG. 4 shows a content addressable storage system having a distributed storage controller configured for implementing the IO hinting functionality in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

The storage devices 406 are configured to store metadata pages 410 and user data pages 412 and may also store additional information not explicitly shown such as checkpoints and write journals. The metadata pages 410 and the user data pages 412 are illustratively stored in respective designated metadata and user data areas of the storage devices 406. Accordingly, metadata pages 410 and user data pages 412 may be viewed as corresponding to respective designated metadata and user data areas of the storage devices 406.

A given "page" as the term is broadly used herein should not be viewed as being limited to any particular range of fixed sizes. In some embodiments, a page size of 8-KB is used, but this is by way of example only and can be varied in other embodiments. For example, page sizes of 4-KB, 16-KB or other values can be used. Accordingly, illustrative embodiments can utilize any of a wide variety of alternative paging arrangements for organizing the metadata pages 410 and the user data pages 412.

The user data pages 412 are part of a plurality of logical units (LUNs) or other storage volumes that are configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 412 can include any type of user data that may be utilized in the system 100. The term "user data" herein is therefore also intended to be broadly construed.

The content addressable storage system 405 in the embodiment of FIG. 4 is configured to generate hash metadata providing a mapping between content-based digests of respective ones of the user data pages 412 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 412. The hash metadata generated by the content addressable storage system 405 is illustratively stored as metadata pages 410 in the metadata area. The generation and storage of the hash metadata is assumed to be performed under the control of the storage controller 408.

Each of the metadata pages 410 characterizes a plurality of the user data pages 412. For example, a given set of user data pages representing a portion of the user data pages 412 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 410 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 410 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

In some embodiments, the content addressable storage system 405 comprises an XtremIO™ storage array suitably modified to incorporate the above described IO hinting functionality.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, IO hinting functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8-KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein in their entirety.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8-KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the host devices 102. In some embodiments, a write request is received in the distributed storage controller 408 of the storage system 405 and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HIVID tables corresponding to respective logical and physical layers of the content-based signature mapping within the storage system 405.

The first level of mapping using the A2H table associates logical addresses of respective data pages with respective content-based signatures of those data pages. This is also referred to logical layer mapping.

The second level of mapping using the HIVID table associates respective ones of the content-based signatures with respective physical storage locations in one or more of the storage devices 406. This is also referred to as physical layer mapping.

For a given write request, both of the corresponding HIVID and A2H tables are updated in conjunction with the processing of that write request.

The A2H and HIVID tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement IO hinting functionality in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with IO hinting functionality will now be described in greater detail with reference to FIGS. 5 and 6. Although described in the context of system 100, these platforms may also be used to implement at least portions of other information processing systems in other embodiments.

Figure 5:
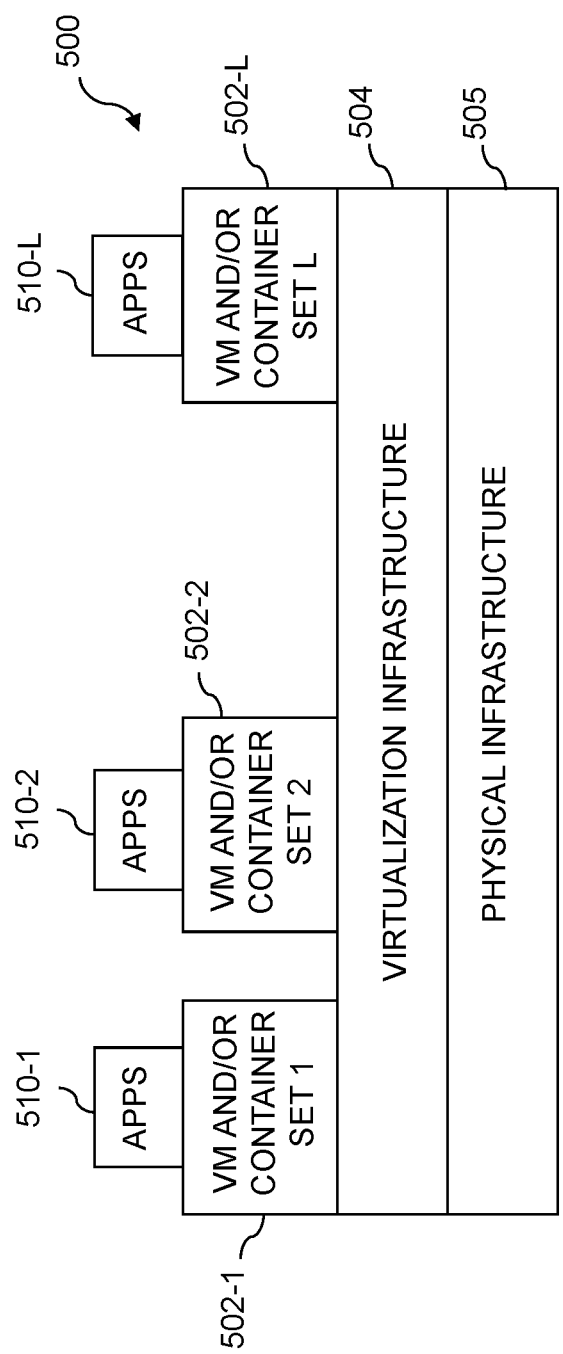
FIGS. 5 and 6 show examples of processing platforms that may be utilized to implement at least a portion of an information processing system in illustrative embodiments.
Figure 6:
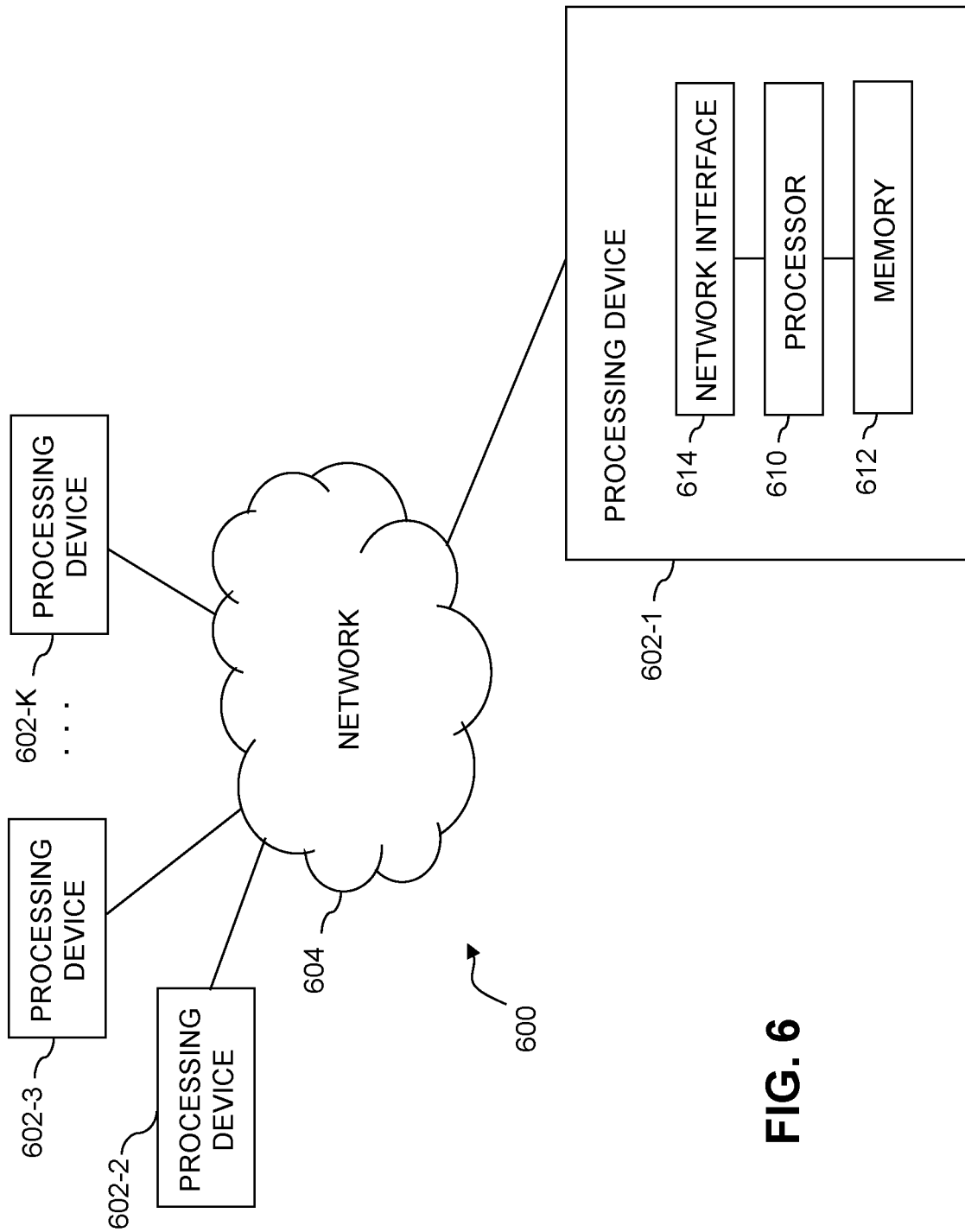

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, ... 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, ... 510-L running on respective ones of the VMs/container sets 502-1, 502-2, ... 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide IO hinting functionality of the type described above for one or more processes running on a given one of the VMs. For example, each of the VMs can implement IO hinting functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide IO hinting functionality of the type described above. For example, a container host device supporting multiple containers of one or more container sets can implement one or more cores executing the IO hinting functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the IO hinting functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, system managers, and IO hinting functionality. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising at least one processing device and a plurality of storage devices, the at least one processing device configured:
to obtain a given input-output operation from a host device, the host device being coupled to the storage system via a network, the host device being configured to execute an application and to generate the given input-output operation and one or more additional input-output operations in conjunction with its execution of the application;

to determine that the given input-output operation obtained from the host device over the network comprises an indicator having a particular value, the particular value indicating that the given input-output operation is a repeat of a prior input-output operation; and to rebuild at least one resource of the storage system that is designated for servicing the given input-output operation based at least in part on the determination that the given input-output operation comprises the indicator having the particular value;

wherein the indicator having the particular value is incorporated into the given input-output operation by the host device; and wherein the indicator having the particular value further provides an indication from the host device to the storage system that, from a viewpoint of the host device, the at least one resource is compromised.

2. The apparatus of claim 1 wherein the indicator comprises at least one bit of the given input-output operation.

3. The apparatus of claim 1 wherein the indicator comprises information identifying the at least one resource as a corrupted resource that requires a rebuild.

4. The apparatus of claim 1 wherein the at least one resource comprises at least one of metadata, a cache, a cache buffer, a fibre channel (FC) exchange, an input-output control block (IOCB), an IO record, a masking table, a mapping table and an initiator table.

5. The apparatus of claim 1 wherein the at least one processing device is further configured to utilize a remote data facility to service the given input-output operation based at least in part on the at least one resource of the storage system being rebuilt.

6. The apparatus of claim 1 wherein the at least one processing device is further configured to utilize at least one local replica device of the storage system to service the given input-output operation based at least in part on the at least one resource of the storage system being rebuilt, the at least one local replica device being a locally stored replica of a given one of the storage devices that is targeted by the given input-output operation.

7. The apparatus of claim 1 wherein the at least one processing device is further configured to utilize at least one other resource of the storage system to service the given input-output operation based at least in part on the at least one resource of the storage system that is designated for servicing the given input-output operation being rebuilt.

8. A method comprising:

obtaining a given input-output operation in a storage system from a host device that is coupled to the storage system via a network, the host device being configured to execute an application and to generate the given input-output operation and one or more additional input-output operations in conjunction with its execution of the application;

determining that the given input-output operation obtained from the host device over the network comprises an indicator having a particular value, the particular value indicating that the given input-output operation is a repeat of a prior input-output operation; and rebuilding at least one resource of the storage system that is designated for servicing the given input-output operation based at least in part on the determination that the given input-output operation comprises the indicator having the particular value;

wherein the indicator having the particular value is incorporated into the given input-output operation by the host device;

wherein the indicator having the particular value further provides an indication from the host device to the storage system that, from a viewpoint of the host device, the at least one resource is compromised; and wherein the method is implemented by at least one processing device of the storage system, the storage system comprising the at least one processing device and a plurality of storage devices, the at least one processing device comprising a processor coupled to a memory.

9. The method of claim 8 wherein the indicator comprises at least one bit of the given input-output operation.

10. The method of claim 8 wherein the indicator comprises information identifying the at least one resource as a corrupted resource that requires a rebuild.

11. The method of claim 8 wherein the at least one resource comprises at least one of metadata, a cache, a cache buffer, a fibre channel (FC) exchange, an input-output control block (IOCB), an TO record, a masking table, a mapping table and an initiator table.

12. The method of claim 8 wherein the method further comprises utilizing a remote data facility to service the given input-output operation based at least in part on the at least one resource of the storage system being rebuilt.

13. The method of claim 8 wherein the method further comprises utilizing at least one local replica device of the storage system to service the given input-output operation based at least in part on the at least one resource of the storage system being rebuilt, the at least one local replica device being a locally stored replica of a given one of the storage devices that is targeted by the given input-output operation.

14. The method of claim 8 wherein the method further comprises utilizing at least one other resource of the storage system to service the given input-output operation based at least in part on the at least one resource of the storage system that is designated for servicing the given input-output operation being rebuilt.

15. A computer program product comprising a non-transitory processor-readable storage medium having stored therein program code of one or more software programs, wherein the program code when executed by at least one processing device of a storage system, causes the at least one processing device:

to obtain a given input-output operation from a host device coupled to the storage system via a network, the host device being configured to execute an application and to generate the given input-output operation and one or more additional input-output operations in conjunction with its execution of the application;

to determine that the given input-output operation obtained from the host device over the network comprises an indicator having a particular value, the particular value indicating that the given input-output operation is a repeat of a prior input-output operation; and to rebuild at least one resource of the storage system that is designated for servicing the given input-output operation based at least in part on the determination that the given input-output operation comprises the indicator having the particular value;

wherein the indicator having the particular value is incorporated into the given input-output operation by the host device; and wherein the indicator having the particular value further provides an indication from the host device to the storage system that, from a viewpoint of the host device, the at least one resource is compromised.

16. The computer program product of claim 15 wherein the indicator comprises at least one bit of the given input-output operation.

17. The computer program product of claim 15 wherein the indicator comprises information identifying the at least one resource as a corrupted resource that requires a rebuild.

18. The computer program product of claim 15 wherein the program code further causes the at least one processing device to utilize a remote data facility to service the given input-output operation based at least in part on the at least one resource of the storage system being rebuilt.

19. The computer program product of claim 15 wherein the program code further causes the at least one processing device to utilize at least one local replica device of the storage system to service the given input-output operation based at least in part on the at least one resource of the storage system being rebuilt, the at least one local replica device being a locally stored replica of a given storage device of the storage system that is targeted by the given input-output operation.

20. The computer program product of claim 15 wherein the program code further causes the at least one processing device to utilize at least one other resource of the storage system to service the given input-output operation based at least in part on the at least one resource of the storage system that is designated for servicing the given input-output operation being rebuilt.

* * * * *